(12) United States Patent
Iguchi (10) Patent No.: US 9,218,418 B2
(45) Date of Patent: Dec. 22, 2015

(54) SEARCH EXPRESSION GENERATION SYSTEM

(75) Inventor: Keiichi Iguchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 537 days.

(21) Appl. No.: 13/378,309

(22) PCT Filed: Jun. 15, 2010

(86) PCT No.: PCT/JP2010/060118
§ 371 (c)(1),
(2), (4) Date: Dec. 14, 2011

(87) PCT Pub. No.: WO2010/147114
PCT Pub. Date: Dec. 23, 2010

(65) Prior Publication Data
US 2012/0089628 A1    Apr. 12, 2012

(30) Foreign Application Priority Data

Jun. 15, 2009 (JP) ................................ 2009-141908

(51) Int. Cl.
*G06F 17/30* (2006.01)

(52) U.S. Cl.
CPC ............................ *G06F 17/30864* (2013.01)

(58) Field of Classification Search
None
See application file for complete search history.

(56) References Cited

U.S. PATENT DOCUMENTS

| | | | |
|---|---|---|---|
| 7,523,104 B2* | 4/2009 | Tanigawa et al. | ...................... 1/1 |
| 2004/0068494 A1* | 4/2004 | Tozawa et al. | ..................... 707/3 |
| 2004/0088652 A1 | 5/2004 | Abe et al. | |
| 2004/0193607 A1* | 9/2004 | Kudo et al. | ........................ 707/9 |
| 2010/0312756 A1* | 12/2010 | Zhang et al. | .................. 707/693 |

FOREIGN PATENT DOCUMENTS

| | | |
|---|---|---|
| JP | 10-027178 A | 1/1998 |
| JP | 2004-046745 A | 2/2004 |
| JP | 2005-301437 A | 10/2005 |
| JP | 2008-084128 A | 4/2008 |

OTHER PUBLICATIONS

Yoko Kasahara, XML Server eXcelon Nyumon Dai 1 Kai, DB Magazine, Jun. 1, 2000, pp. 214-220, vol. 10, No. 2.
Yuichiro Masui, "Script o Shuroku! Website eno Login & Data Nyuryoku o Jidoka suru," Nikkei Linux, Jun. 9, 2009, pp. 69-74, vol. 11, No. 7.

* cited by examiner

*Primary Examiner* — Robert Beausoliel, Jr.
*Assistant Examiner* — Susan F Rayyan
(74) *Attorney, Agent, or Firm* — Sughrue Mion, PLLC (57) ABSTRACT

A search expression is automatically generated for designating a target element for a Web page whose contents change according to a system state or the number of elements to be displayed. The search expression generation device comprises the model sentence accumulation unit which accumulates a plurality of model sentences of structured documents, the element designation unit which designates an element to be searched in a model sentence, the structured document analysis unit which analyzes a structure of a model sentence, and the search expression structuring unit which adds or deletes the element selected to or from a search expression, wherein the structured document analysis unit analyzes a structure of a model sentence to generate a search expression with a condition added which is common to a plurality of model sentences of the same kind.

19 Claims, 6 Drawing Sheets

(a)
```
<TABLE>
<TR><TD>CONFERENCE NAME</TD><TD>□□
<SMALL>(SUPPLEMENT)</SMALL></TD></TR>
<TR><TD>SPONSOR</TD><TD>□□</TD></TR>
<TR><TD>TIME AND DATE</TD><TD>2009/01/01</TD></TR>
</TABLE>
```

(b)
```
<TABLE>
<TR><TD>CONFERENCE NAME</TD><TD>○○</TD></TR>
<TR><TD>SPONSOR</TD><TD>○○</TD></TR>
<TR><TD>SUPPORTER</TD><TD>○○</TD></TR>
<TR><TD>TIME AND DATE</TD><TD>2008/12/01</TD></TR>
</TABLE>
```

| CONFERENCE NAME | □□(SUPPLEMENT) |
|---|---|
| SPONSOR | □□ |
| TIME AND DATE | 2009/01/01 |

(b)

| CONFERENCE NAME | ○○ |
|---|---|
| SPONSOR | ○○ |
| SUPPORTER | ○○ |
| TIME AND DATE | 2008/12/01 |

/TABLE[1]/TR[3]/TD[2]

(b)

/TABLE[1]/TR[4]/TD[2]

```
/TABLE[1]
[TR[1]TD[1][text()='CONFERENCE NAME']][TD[2][text()='☐☐
'][SMALL[text()='(SUPPLEMENT)']]]
[TR[2]TD[1][text()='SPONSOR']][TD[2][text()='☐☐']]]
/TR[3]
 [TD[1][text()='TIME AND DATE']]
/TD[2][text()='2009/01/01']
```

(b)

```
/TABLE[1]
[TR[1][*[1][text()='CONFERENCE
NAME']][*[2]]]
[TR[2][TD[1][text()='SPONSOR']][TD[2]]]
/TR[3]
 [TD[1][text()='TIME AND DATE']]
/TD[2][]
```

FIG. 8

# SEARCH EXPRESSION GENERATION SYSTEM

CROSS REFERENCE TO RELATED APPLICATIONS

This application is a National Stage of International Application No. PCT/JP2010/060118 filed Jun. 15, 2010, claiming priority based on Japanese Patent Application No. 2009-141908 filed Jun. 15, 2009 the contents of all of which are incorporated herein by reference in their entirety.

TECHNICAL FIELD

The present invention relates to a search expression generation device, a search expression generation system, a search expression generation server, a search expression generation method and a search expression generation program and, more particularly, to a technique suitable for use in extracting desired information from a Web (World Wide Web) page with a structured document as a target to be searched.

BACKGROUND ART

One example of a data extraction system is disclosed in Patent Literature 1 which extracts desired information from a Web page with a structured document as a target to be searched. According to Patent Literature 1, the data extraction system is formed of a communication device, a central processing device, a data extraction unit, a data extraction reconstructing unit, extraction data and extraction basic data.

In the above-described structure, the data extraction reconstructing unit obtains a Web page by using the communication device and compares the obtained page with the previously obtained Web page to determine whether there occurs a change in an HTML (Hyper Text Markup Language) structure. Then, when a change occurs, the unit obtains a Web page having a new HTML structure with reference to URL (Uniform Resource Locator) described in the extraction basic data. Next, the data extraction reconstructing unit searches the new HTML for each value of the extraction basic data and reconstructs a data extraction program using tags preceding and succeeding the value.

On the other hand, Patent Literature 2 discloses a device for designating an element of a structured document which relieves a user of the burden at the time of setting an element for use as an index when a structured document is searched. According to the related art disclosed in the Patent Literature 2, the element designation device has filter data stored in advance which has a path expression that designates an element and designation information that defines designation/designation-release associated with an element specified by the path expression, obtains a matching element from a structured document based on the path expression of the designation information and obtains a descriptor associated with the path expression to designate an element or release designation of the same.

Patent Literature 1: Japanese Patent Laying-Open No. 2005-301437.

Patent Literature 2: Japanese Patent Laying-Open No. 2008-84128.

First problem of the related art disclosed in the above-described Patent Literature 1 is that a search expression that designates a target element cannot be automatically generated for a Web page whose contents change according to a system state or the number of elements to be displayed.

The reasons are that structured documents are output to have structures a little different from each other according to a system state or the number of elements to be displayed even as outputs of the same system and that it cannot be automatically determined which element is to be a reference to search an element to be detected from a single Web page.

Second problem is that it is impossible to automatically detect a structure change of a Web page whose contents change. The reasons are that since structured documents are output to have structures a little different from each other according to a system state or the number of elements to be displayed even as outputs of the same system, they fail to completely coincide with each other even without a change and that it cannot be determined which element should be confirmed to have no change from a single Web page.

Third problem is that an erroneous element might be designated. The reason is that since only a description in the vicinity of a search target is compared and detected, it is impossible to verify whether it is an appropriate element or not when the number of elements is changed, when a similar character string is added to other place or in other case.

On the other hand, according to the related art disclosed in Patent Literature 2, since designation/designation-release of an element held by a structured document is automatically executed using element designation correspondence information (filter data), flexibility is more improved than that by element designation only by a structure path expression, thereby relieving a user of the burden at the time of designating an element included in a structured document. There, however, remains a problem that a search expression for designating a target element cannot be automatically generated for a Web page whose contents are changed according to a system state or the number of elements to be displayed.

The reason is that the related art of Patent Literature 2 fails to relate to automatic generation of a search expression with a condition common to a plurality of structured documents added or with the other elements deleted from the search expression.

OBJECT OF THE INVENTION

An object of the present invention is to provide a search expression generation device, a search expression generation system, a search expression generation server, a search expression generation method and a search expression generation program which enable automatic generation of a search expression for designating an element to be searched with respect to a Web page whose contents change according to a system state or the number of elements to be displayed.

SUMMARY

According to a first exemplary aspect of the invention, a search expression generation device, includes a model sentence accumulation unit which accumulates a plurality of model sentences of structured documents to be searched on a kind basis, an element designation unit which designates an element to be searched in a model sentence designated from the plurality of model sentences of the structured documents, a structured document analysis unit which analyzes a structure of the model sentence designated to select an element to be added to a search expression as a condition and an element to be deleted from the search expression as a condition based on the element designated to be searched, and a search expression structuring unit which adds or deletes the element selected to or from a search expression, wherein the structured document analysis unit analyzes a structure of a model sentence designated by the element designation unit to generate a search expression with a condition added which is common to a plurality of model sentences of the same kind.

According to a second exemplary aspect of the invention, a search expression generation system, includes search expression generation browser including an element designation unit which designates each element to be searched in a plurality of model sentences of structured documents to be searched and a model sentence collection unit which obtains the model sentence from outside the device and accumulates the model sentence on a document kind basis, and a search expression generation server having a model sentence accumulation unit connected to the search expression generation browser via a network for accumulating the model sentence on a document kind basis, a structured document analysis unit which analyzes a structure of the structured document to select an element to be added to a search expression as a condition based on the search target element designated and an element to be deleted from the search expression as a condition, and a search expression structuring unit which adds or deletes the element selected to or from a search expression, wherein the structured document analysis unit of the search expression generation server analyzes a structure of a model sentence designated by the element designation unit to generate a search expression with a condition added which is common to a plurality of model sentences of the same kind.

According to a third exemplary aspect of the invention, a search expression generation server connected via a network to a search expression generation browser including an element designation unit which designates each element to be searched in a plurality of model sentences of structured documents to be searched and a model sentence collection unit which obtains the model sentence from outside the device and accumulates the model sentence on a document kind basis, includes a model sentence accumulation unit which accumulates a plurality of model sentences obtained by the model sentence collection unit on a document kind basis, a structured document analysis unit which analyzes a structure of the structured document to select an element to be added to a search expression as a condition and a condition to be deleted from the search expression based on the designated element to be searched, and a search expression structuring unit which adds the element to be added which is selected by the structured document analysis unit to the search expression and deletes the condition to be deleted which is selected by the structured document analysis unit from the search expression, wherein the structured document analysis unit analyzes a structure of a model sentence designated by the element designation unit to generate a search expression with a condition added which is common to a plurality of model sentences of the same kind.

According to a fourth exemplary aspect of the invention, a search expression generation method for use in a search expression generation device including an input/output device, an arithmetic operation control device and a storage device, includes a model sentence accumulation step of accumulating a plurality of model sentences of structured documents to be searched in the storage device on a kind basis by the arithmetic operation control device, an element designation step of designating elements to be searched in a plurality of model sentences by the input/output device, a structured document analysis step, by the arithmetic operation control device, of analyzing a structure of the structured document based on a search target element designated at the element designation step to select an element to be added to a search expression as a condition and an element to be deleted from the search expression as a condition, and a search expression structuring step of adding or deleting an element selected at the structured document analysis step to or from the search expression by the arithmetic operation control device.

According to a fifth exemplary aspect of the invention, a search expression generation method for use in a search expression generation system having a search expression generation server and a search expression generation browser connected via a network, includes a model sentence collection step of externally obtaining a plurality of model sentences of structured documents to be searched and accumulating the model sentence obtained in the search expression generation server on a document kind basis by the search expression generation browser, an element designation step of designating each element to be searched in the structured document by the search expression generation browser, a structured document analysis step of analyzing a structure of the structured document based on an element designated at the element designation step to select an element to be added to a search expression as a condition and an element to be deleted from the search expression as a condition by the search expression generation server, and a search expression structuring step, by the search expression generation server, of adding or deleting an element selected at the structured document analysis step to or from the search expression.

According to a sixth exemplary aspect of the invention, a search expression generation program which is to be executed on a computer and which is provided in a search expression generation device for generating a search expression of a plurality of model sentences of structured documents to be searched, which causes the computer to execute a model sentence collection processing of obtaining the plurality of model sentences and accumulating the model sentences on a document kind basis, an element designation processing of designating an element to be searched in the plurality of model sentences, a structured document analysis processing of analyzing a structure of the structured document designated by the element designation processing to select an element to be added to a search expression as a condition and an element to be deleted from the search expression as a condition based on the search target element designated, and a search expression structuring processing of adding the element selected to the search expression or deleting the element from the search expression.

According to a seventh exemplary aspect of the invention, a search expression generation program which is to be executed on a computer and which is provided in a search expression generation server which externally obtains a plurality of model sentences of structured documents to be searched and is connected to a search expression generation browser which designates each element to be searched in the plurality of model sentences via a network, which causes the computer to execute a model sentence accumulation processing of accumulating a plurality of structured documents obtained by the search expression generation browser on a document kind basis, a structured document analysis processing of analyzing a structure of the structured document based on a search target element designated by the search expression generation browser to select an element to be added to a search expression as a condition and a condition to be deleted from the search expression, and a search expression structuring processing of adding the element to be added which is selected by the structured document analysis processing to the search expression and deleting the condition to be deleted from the search expression.

The present invention enables a search expression generation device, a search expression generation system, a search expression generation server, a search expression generation method and a search expression generation program to be provided which enable automatic generation of a search expression for designating an element to be searched with respect to a Web page whose contents change according to a system state or the number of elements to be displayed.

The reason is that a structured document analysis unit analyzes a structure of a model sentence designated by an element designation unit to generate a search expression with a condition added which is common to a plurality of model sentences of the same kind.

EXEMPLARY EMBODIMENT

Next, an exemplary embodiment of the present invention will be described in detail with reference to the drawings.

Structure of First Exemplary Embodiment

Figure 1:
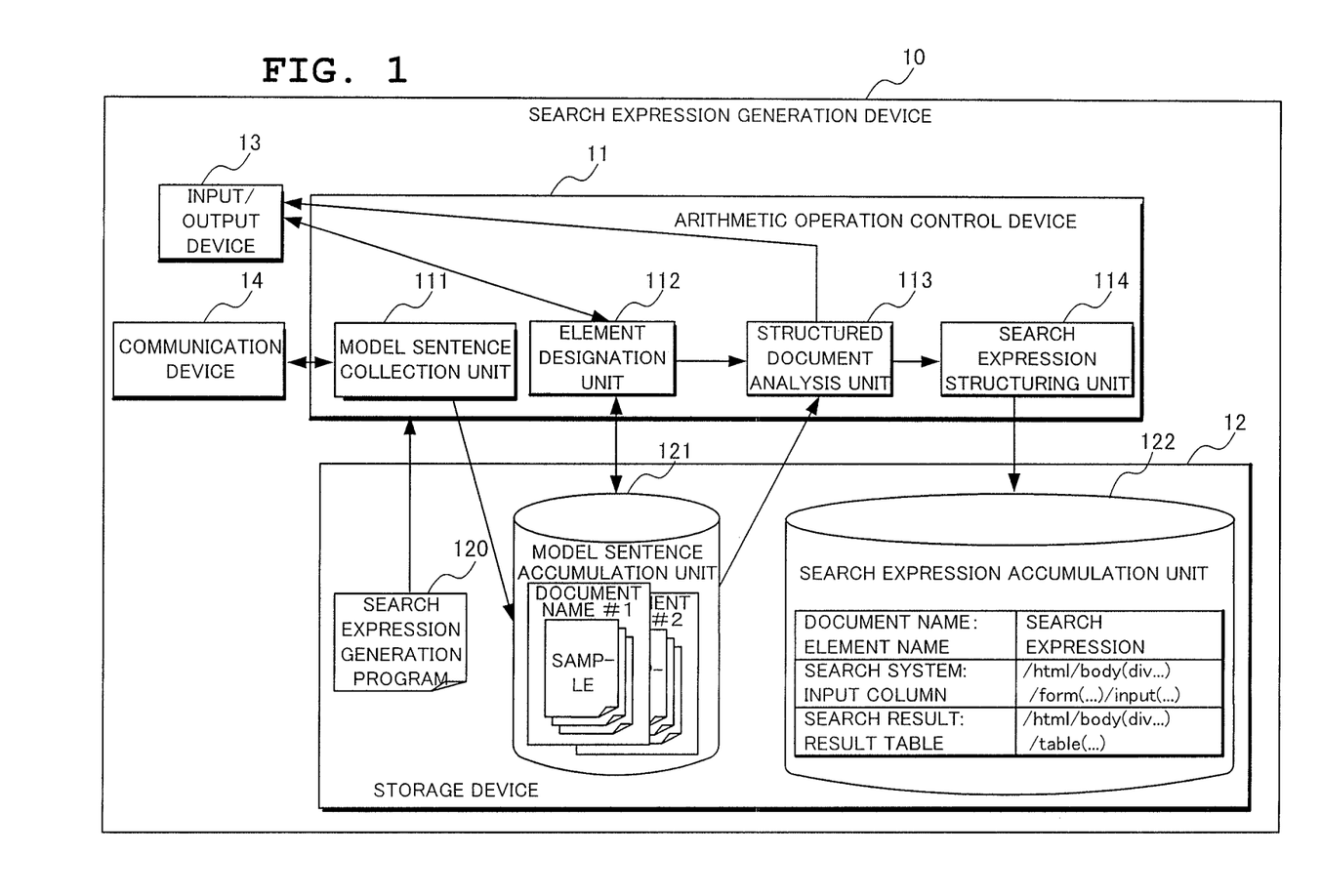
FIG. 1 is a block diagram showing a structure of a search expression generation device according to an exemplary embodiment of the present invention.

FIG. 1 is a block diagram showing a structure of a search expression generation device 10 according to a first exemplary embodiment of the present invention.

With reference to FIG. 1, the search expression generation device 10 according to the first exemplary embodiment of the present invention includes an arithmetic operation control device 11, a storage device 12, an input/output device 13 and a communication device 14.

The arithmetic operation control device 11, which is a so-called CPU (Central Processing Unit), functions as a center of control of the search expression generation device 10 according to the present exemplary embodiment. The storage device 12, which is formed of, for example, a non-volatile storage device (non-volatile semiconductor memory, a hard disk device, an optical disk device, etc.) or a random access storage device (e.g. SRAM, DRAM), here stores or accumulates a search expression generation program 120, a model sentence accumulation unit 121 and a search expression accumulation unit 122 which are each assigned to a predetermined region.

The input/output device 13, which is formed of an LCD (Liquid Crystal Display Device) touch panel, for example, functions as a man-machine interface between a user and the search expression generation device 10 (arithmetic operation control device 11). The communication device 14 is a network interface which executes communication with a server connected via a network not shown by, for example, TCP/IP (Transmission Control Protocol/Internet Protocol) protocol.

The arithmetic operation control device 11 executes a function of sequentially reading and executing the search expression generation program 120 stored in the storage device 12 to analyze a structure of a model sentence, and adding a condition common to a plurality of model sentences of the same kind and deleting a different element of the plurality of model sentences of the same kind from the search expression. Therefore, as shown in the figure, the function of the search expression generation program 120 executed by the arithmetic operation control device 11 is expanded as a model sentence collection unit 111, an element designation unit 112, a structured document analysis unit 113 and a search expression structuring unit 14 in the arithmetic operation control device 11.

The model sentence collection unit 111 has a function of obtaining a structured document to be searched and attaching a document name to the document on a document kind basis to accumulate the obtained document in the model sentence accumulation unit 121 assigned to a predetermined region of the storage device 12. The model sentence collection unit 111 may obtain a structured document from a server not shown which is externally connected through the communication unit 14. A preferable example of a structured document to be searched is an HTML document.

"Kind of document" here represents a document output by the same system for the same purpose, which includes classifications, for example, such as a condition input page, a result list page and a detailed display page, etc. Preferable examples of a document name include a title of a document recited in a structured document, URL for obtaining a structured document and the like. User may input a document name by operating the input/output device 13. As will be described later, in the model sentence accumulation unit 121 of the storage device 12, structured documents are accumulated on a document name basis.

The element designation unit 112 has a function of designating an element to be searched from a model sentence of each structured document accumulated in the model sentence accumulation unit 121 of the storage device 12 to forward a model sentence to be searched which is obtained from the model sentence accumulation unit 121, an identifier which identifies an element to be searched in a model sentence and an element to be searched to the structured document analysis unit 113. Screen display by the input/output device 13 may be display of a structured document by a browser. Structure of a structured document may be displayed.

The structured document analysis unit 113 has a function of obtaining and analyzing a model sentence of a structured document from the model sentence accumulation unit 121 based on a model sentence forwarded from the element designation unit 112 to add, to a search expression, elements focusing on elements to be searched which are designated by the element designation unit 112 or to determine an element to be deleted from the search expression. The search expression structuring unit 114 has a function of structuring a search expression based on information received from the structured document analysis unit 113 and accumulating the same in the search expression accumulation unit 122 of the storage device 12. At this time, the search expression accumulation unit 122 accumulates the search expression structured by the search expression structuring unit 114 together with a document name and an element name.

The element designation unit 112 may be structured to display a structured document on a screen by the input/output device 13 and allow a user to designate an element to be searched. The unit may be also structured to input an element to be searched on a structured document basis as a list.

It may be also structured such that the model sentence collection unit 111 sets a unitary model sentence identifier for a model sentence of each structured document and then the element designation unit 112 forwards the model sentence to the structured document analysis unit 113 by the model sentence identifier. Preferable example of a model sentence identifier for identifying an element to be searched in a model sentence is an identifier set in advance for the model sentence or an identifier added by the element designation unit 112 to the model sentence. Other preferable example is a number obtained when the number of elements in the model sentence is sequentially counted from the top. A further preferable example is a search expression in which an element name for tracing back to a relevant element from the top element and a numerical value indicative of its position in a brother element in a model sentence are arranged in order.

Operation of the First Exemplary Embodiment

Figure 2:
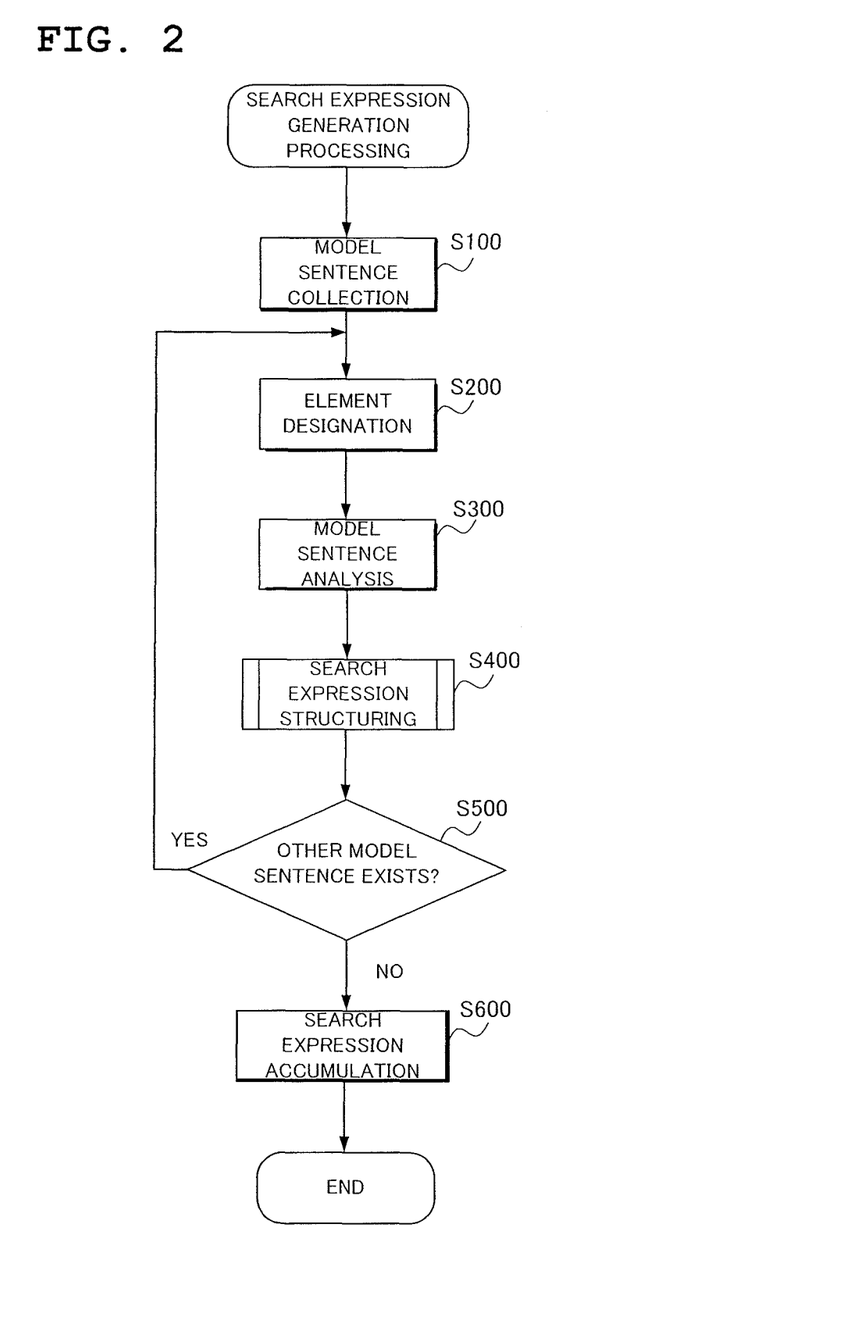
FIG. 2 is a flow chart showing search expression generation processing operation of the search expression generation device according to the exemplary embodiment of the present invention.
Figure 3:
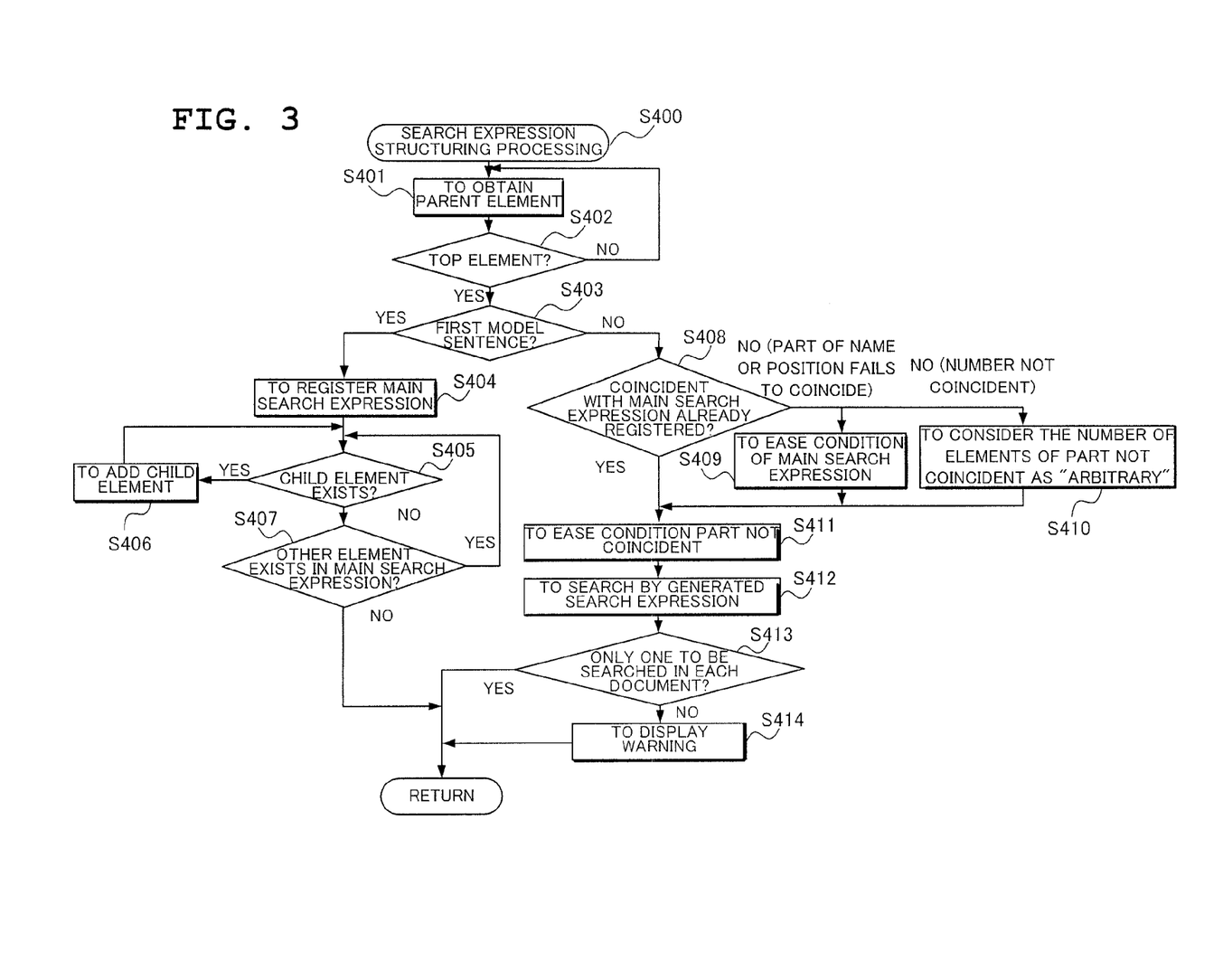
FIG. 3 is a flow chart showing search expression structuring processing operation of the search expression generation device according to the exemplary embodiment of the present invention.

FIG. 2 and FIG. 3 are flow charts showing operation of the search expression generation device 10 according to the first exemplary embodiment of the present invention shown in FIG. 1, which illustrate search expression generation processing operation (FIG. 2) and search expression structuring processing operation (FIG. 3), respectively. In the following, detailed description will be made of operation of the search expression generation device 10 according to the first exemplary embodiment of the present invention shown in FIG. 1 with reference to the flow charts of FIG. 2 and FIG. 3.

With reference to FIG. 2, in the arithmetic operation control device 11, the model sentence collection unit 111 collects a plurality of model sentences of structured documents to be searched, applies a document name to the sentence on a document kind basis and accumulates the obtained model sentences in the model sentence accumulation unit 121 of the storage device 12 (Step S100).

Next, the element designation unit 112 displays a model sentence of one structured document among a plurality of structured document model sentences on the screen of the input/output device 13, takes an element to be searched from the structured document based on a user instruction and forwards the model sentence to be searched, an identifier for identifying the element to be searched and the element to be searched to the structured document analysis unit 113 (Step S200). The structured document analysis unit 113 responsively analyzes the structure of the forwarded model sentence (Step S300) to determine an element to be added to or to be deleted from a search expression focusing on an element to be searched which is designated by the element designation unit 112. Then, by adding or deleting the determined element to be added or to deleted to/from the search expression by the search expression structuring unit 114, the search expression is structured (Step S400).

When other model sentence having the same document name as that of the model sentence designated by the element designation unit 112 attached is accumulated in the model sentence accumulation unit 121 of the storage device 12 ("YES" at Step S500), the arithmetic operation control device 11 (the structured document analysis unit 113, the search expression structuring unit 114) repeatedly executes the above-described operation of Steps S200 to S400 to accumulate a search expression structured here in the search expression accumulation unit 122 assigned to a predetermined region of the storage device 12 (Step S600).

In the processing of determining whether other model sentence exists or not at Step S500, only as many model sentences as the number of sentences designated in advance may be considered as a target in place of all model sentences in the model sentence accumulation unit 121 considered as a target. This enables the load on the arithmetic operation control device 11 for generating a search expression to be mitigated.

Next, detailed description will be made of search expression structuring processing operation of determining an element to be added or deleted by the structured document analysis unit 113 and adding or deleting a determined element to/from a search expression by the search expression structuring unit 114 with reference to the flow chart of FIG. 3.

With reference to FIG. 3, first, the structured document analysis unit 113 sequentially obtains a parent element of an element to be searched and a position of the element to obtain an element for tracing back to the target element from the top element (Steps S401 and S402). Here, when a model sentence being processed is the first model sentence (first model sentence) ("YES" at Step S403), register the obtained element at a working region not shown of the storage device 12 as a main search expression (Step S404). When a search expression to be generated is XPath, for example, described is "/HTML/BODY[1]/TABLE[2]/TR[2]/TD[1]".

When the target element has a child element here ("YES" at Step S405), the structured document analysis unit 113 adds the child element to the search expression (Step S406). When a search expression to be generated is XPath expression, for example, it is described as a predicate. When the child element further has a child element ("YES" at Step S407), repeatedly execute the child element addition processing of Step S406. When there exists a child element yet to be added with respect to the element added by the search expression addition processing of Step S406 ("NO" at Step S405), the structured document analysis unit 113 repeatedly executes the search expression addition processing of Step S406.

In the child element determination processing of Step S405, the number of child elements to be recursively tracked back may be limited. This enables mitigation of the load on the arithmetic operation control device 11 which generates a search expression and executes search by using the search expression.

Also in the child element addition processing of Step S406, elements to be added may be limited to an element near an element for tracking back to a target element. This enables mitigation of the load on the arithmetic operation control device 11 at the time of generating a search expression and the load of searching by using the search expression. Although thus limiting an element to be added speeds up search processing, because change detection precision will be deteriorated, the search expression structuring unit 302 may structure and generate two search expressions, a search expression to be constantly used which has a limitation to an element and a search expression for detecting a change with all the elements added. This arrangement realizes a balance between the load of searching by using a search expression and precision in detecting a change.

On the other hand, when in the first model sentence determination processing at Step S403, a model sentence being processed is after the first model sentence ("NO" at Step S403) and a search expression being structured is already in the search expression structuring unit 114, the search expression structuring unit 114 compares the model sentence with an element structuring a main search expression described in the already registered search expression (Step S408) and when they fail to coincide ("NO" at Step S408), ease conditions of the main search expression by the following processing.

More specifically, when only a part of element names fail to coincide, the structured document analysis unit 113 eases conditions of the main search expression by registering the relevant element as an arbitrary element name (Step S409). In a case where a search expression to be generated is XPath, for example, described is node ( ) or *. When elements for tracing back to a target element from the top element described in the already registered search expression fail to coincide in the number of elements, the structured document analysis unit 113 calculates the longest coincident parts of the two and records a part failing to coincide with each other as an arbitrary number of arbitrary elements (Step S410). In a case where a search expression to be generated is XPath, for example, described is "/descendant—or—self::node( )" or "//". When coinciding in the processing of comparison with an already registered main search expression at Step S408 ("YES" at Step S408), the structured document analysis unit 113 eases a condition part failing to coincide with the model sentence among condition parts described in the search expression (Step S411). This condition part can be eased by deletion.

When in the processing of comparison with the already registered main search expression at Step S408, the element position fails to coincide, only a condition indicative of a position may be deleted. This arrangement enables a more detailed condition to be left. In the main search expression easing processing at Step S410, with respect to a coincident part, the longest coincident part may not be calculated but a back coincident part may be calculated. This arrangement enables the load on the arithmetic operation processing device 11 which generates a search expression to be mitigated.

Also in the processing of easing a non-coincident condition part at Step S411, the condition part can be eased by the selection from a plurality of choices. This enables a more detailed condition to be left. As to a condition part, when a target element is an element indicative of a character string value and a registered condition coincides with a part of a character string of the element in question of a model sentence being analyzed, the condition may be changed so as to indicate a coincident part. This enables a more detailed condition to be left.

The structured document analysis unit 113 further executes search of all the model sentences processed so far by using a search expression being structured by the search expression structuring unit 114 (Step S412) and when each document has more than one element to be searched ("NO" at Step S413), presents to a user, by the input/output device 13, a warning that elements designated by these model sentences cannot be searched by the same search expression (Step S414). At this time, the structured document analysis unit 113 may allow a user to make selection between cancellation of the model sentence and division of the model sentence for restructuring.

Figure 4:
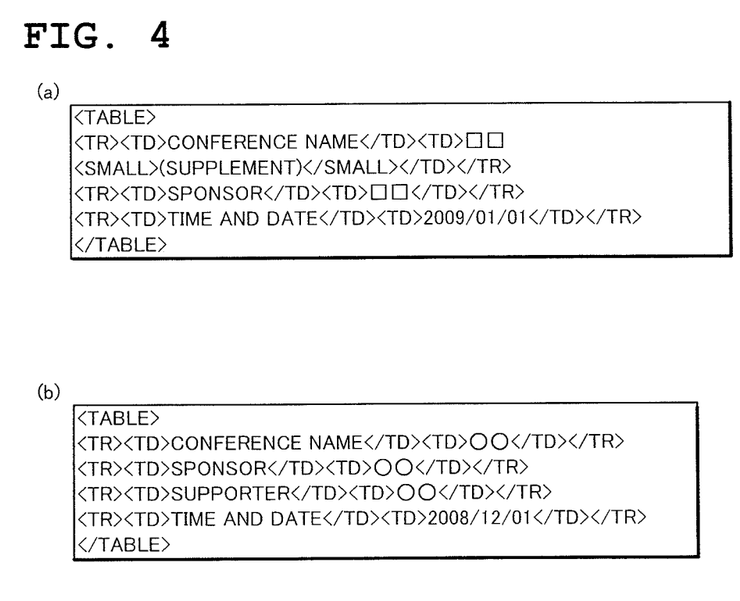
FIG. 4 is a diagram showing one example of a model sentence (structured document) for use in the search expression generation device according to the exemplary embodiment of the present invention.
Figure 5:
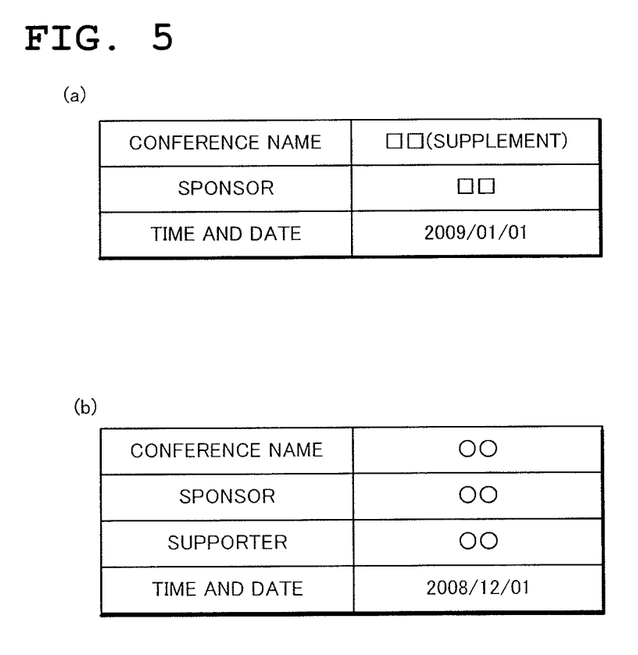
FIG. 5 is a diagram showing one example of screen display for use in the search expression generation device according to the exemplary embodiment of the present invention.
Figure 6:
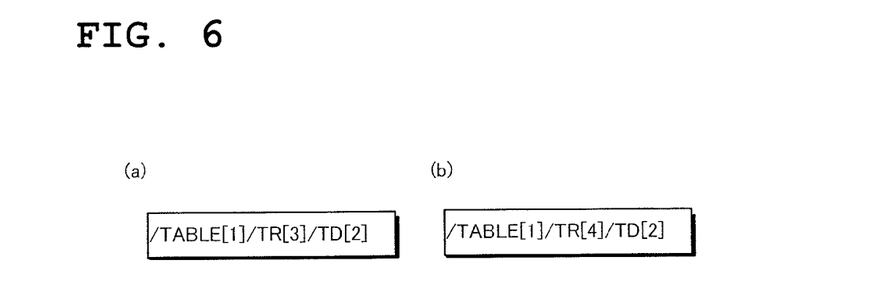
FIG. 6 is a diagram showing one example of a main search expression for use in the search expression generation device which is described in XPath system according to the exemplary embodiment of the present invention.

FIG. 4 to FIG. 7 show specific examples of search expression automatic generation of the search expression generation device 10 according to the first exemplary embodiment of the present invention. FIGS. 4(*a*) and 4(*b*) each show one example of a model sentence (HTML document) collected by the model sentence collection unit 111 and accumulated in the model sentence accumulation unit 120 of the storage device 12 and FIGS. 5(*a*) and 5(*b*) each show an example of screen display corresponding to the model sentences in FIGS. 4(*a*) and 4(*b*), respectively. FIGS. 6(*a*) and 6(*b*) are diagrams each showing a XPath expression describing one example of a main search expression on a model sentence basis and FIGS. 7(*a*) and 7(*b*) are diagrams each showing an automatically generated search expression described in a XPath expression. In the following, supplementary description will be made of operation of the search expression generation device 10 according to the first exemplary embodiment of the present invention shown in FIGS. 1 to 3 with respect to two specific examples.

In the above-described specific example, it is assumed that the search expression generation device 10 accesses an external server via a network by the communication device 14 to collect the model sentence shown in FIG. 4(*a*). This operation corresponds to the operation of Step 100 shown as the basic operation in FIG. 2. At this time, the element designation unit 112 displays the table of FIG. 4(*a*) which is a screen display example in FIG. 5(*a*) on the screen of the input/output device 13 to allow the user to designate an element to be searched. It is assumed that at this time, the user operates the input/output device 13 to selectively designate a frame having the indication of "2009/01/01". This is the operation of Step S200 shown in the basic operation in FIG. 2.

Figure 7:
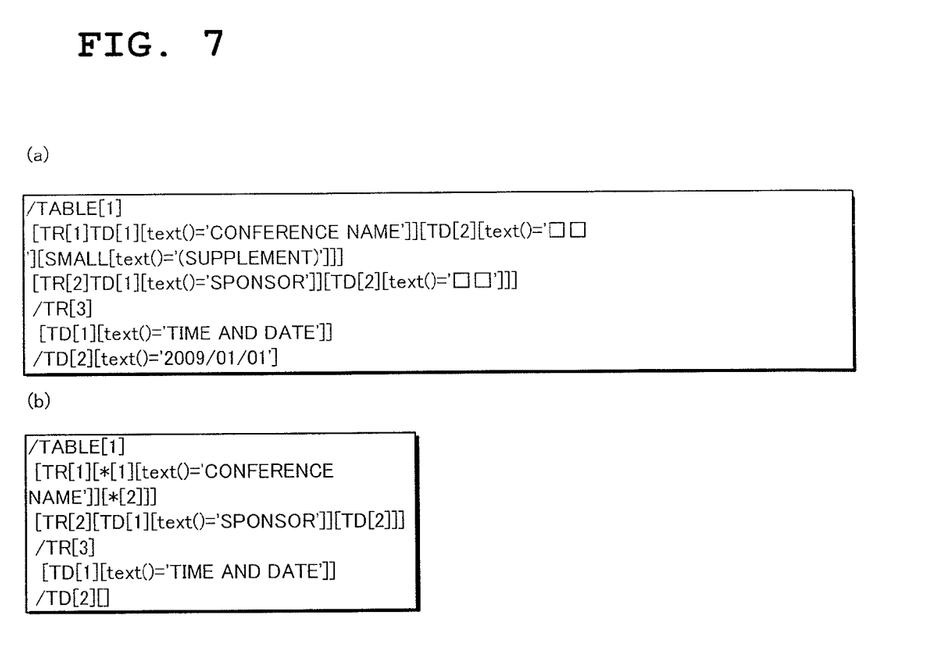
FIG. 7 is a diagram showing one example of a search expression automatically generated by the search expression generation device which is described in XPath system according to the exemplary embodiment of the present invention.

Next, the structured document analysis unit 113 executes the model sentence analysis processing (S300) and the search expression structuring unit 114 executes the search expression structuring processing (S400), in which when the structured document analysis unit 113 first traces back to a parent element of the element designated by the element designation unit 112 up to the top element, "TD[2]", "TR[3]" and "TABLE[1]" are sequentially obtained. Since this is the first model sentence, register the main search expression shown in FIG. 6(*a*). Next, since a character string value exists as a child element, register "text( )". With respect to all the other elements of the main search expression, sequentially adding a child element leads to generation of the XPath expression shown in FIG. 7(*a*). The foregoing operation corresponds to the processing of Steps S401 to S407 in FIG. 3.

On the other hand, it is assumed that the search expression generation device 10 accesses an external server not shown via a network by the communication device 14 to collect the model sentence shown in FIG. 4(*b*). This operation corresponds to the operation of Step 100 shown as the basic operation in FIG. 2. At this time, the element designation unit 112 displays the table of FIG. 4(*b*) as a screen display example in FIG. 5(*b*) on the screen of the input/output device 13 to allow the user to designate an element to be searched. It is assumed that at this time, the user operates the input/output device 13 to designate a frame having the indication of "2008/12/01".

Next, the structured document analysis unit 113 executes the model sentence analysis processing (S300) and the search expression structuring unit 114 executes the search expression structuring processing (S400), in which when the structured document analysis unit 113 first traces back to a parent element of the element designated by the element designation unit 112 up to the top element, "TD[2]", "TR[4]" and "TABLE[1]" are sequentially obtained. Since the model sentence being processed is the second model sentence here, compare the sentence with the already registered main search expression shown in FIG. 6(b). In this case, the number 3 is coincident but the position of the second element "/TR[3]" fails to coincide. Accordingly, the structured document analysis unit 113 deletes the second position condition. Subsequently, with respect to other condition parts, delete a part not coincident with the model sentence shown in FIG. 4(b) to ultimately generate the XPath expression shown in FIG. 7(b). The foregoing operation corresponds to the processing of Steps S401 to S408 in FIG. 3.

In comparison here between the XPath expression shown in FIG. 7(a) and the XPath expression shown in FIG. 7(b), it can be found that a character string value "□□" peculiar to FIG. 5(a) and an element <SMALL> are deleted. Searching the model sentences shown in FIGS. 4(a) and 4(b) by using the search expression shown in FIG. 7(b) finds that only one part coincides with each other (Step S412). When the processing is completed with respect to all the model sentences, preserve the generated search expression in the search expression accumulation unit 122 together with a page name and an element name to end (Step S600 in FIG. 2).

Effects of the First Exemplary Embodiment

Since the search expression generation device 10 according to the exemplary embodiment of the present invention is structured to use a plurality of model sentences and generate a search expression from an element common thereto, it is possible to automatically generate a search expression which enables reliable designation of an element to be searched for a Web page whose contents change according to a system state or the number of elements to be displayed.

In addition, since the device is structured to use a plurality of model sentences to generate a search expression including an element of a whole document common to these sentences, it is possible to generate a search expression which enables automatic detection of a structure change for a Web page whose contents change according to a system state or the number of elements to be displayed. Moreover, since the device is structured to generate, from a plurality of model sentences, a search expression including, as a condition, an element unchangeable even when the contents change according to a system state or the number of elements to be displayed, it is possible to generate a search expression by which none of elements not to be searched is erroneously detected for a Web page whose contents change according to a system state or the number of elements to be displayed even when a Web page to be searched has a change in the number of elements or has a similar character string.

The functions that the search expression generation device 10 (arithmetic operation control device 11) shown in FIG. 1 has may be realized all in software or at least a part of them may be realized in hardware. The data processing, for example, of designating an element to be searched in a plurality of model sentences by the element designation unit 112, analyzing a structure of the model sentence designated by the element designation unit 112 to generate a search expression with a condition common to a plurality of model sentences of the same kind added by the structured document analysis unit 113 and adding or deleting the selected element by the search expression structuring unit 114 may be realized on a computer by one or a plurality of programs or at least a part of the same may be realized in hardware.

Structure of Second Exemplary Embodiment

Figure 8:
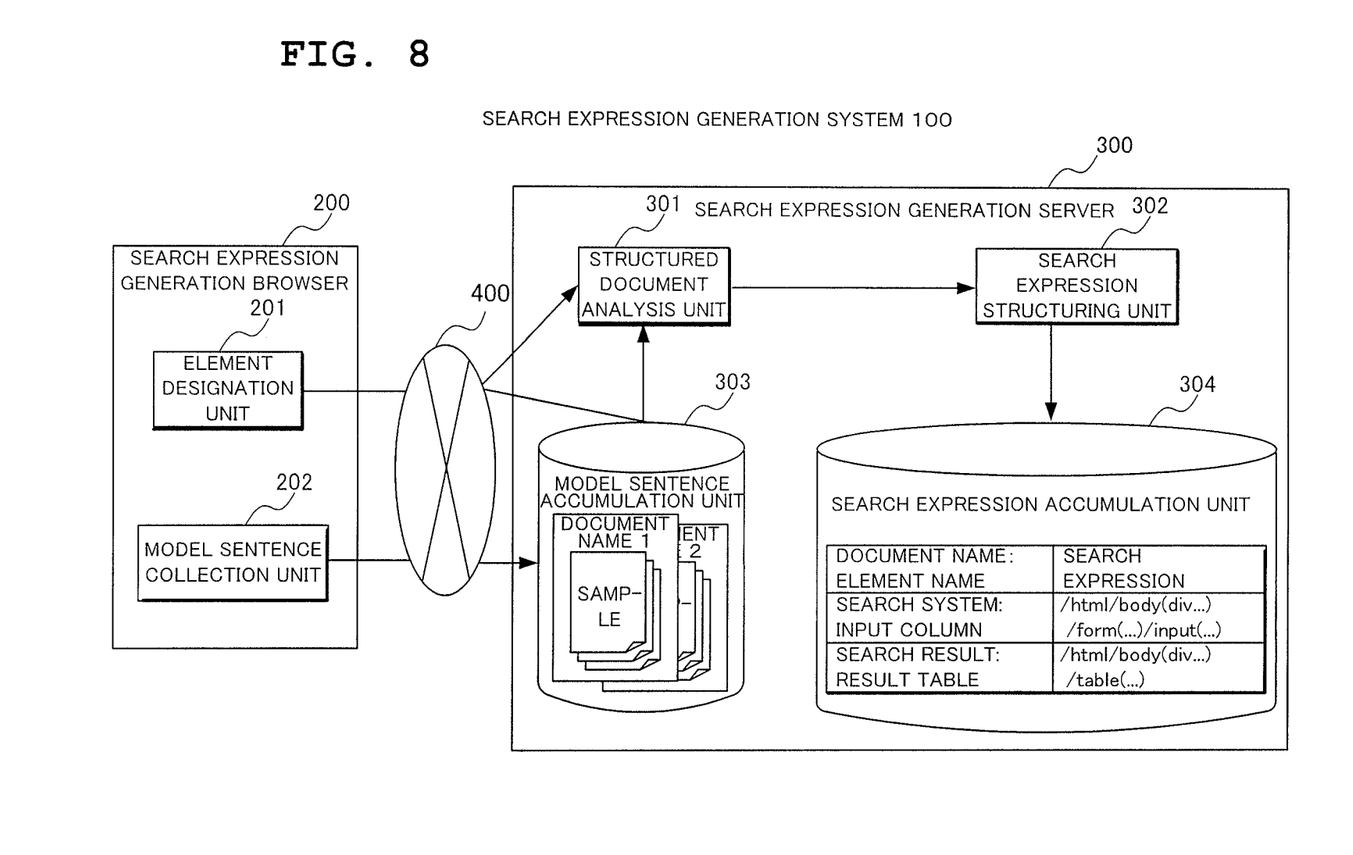
FIG. 8 is a block diagram showing a structure of a search expression generation system according to the exemplary embodiment of the present invention.

FIG. 8 is a block diagram showing a structure of a search expression generation device according to a second exemplary embodiment of the present invention. In the second exemplary embodiment of the present invention which will be described in the following, difference from the first exemplary embodiment shown in FIG. 1 is that while the first exemplary embodiment adopts the search expression generation device 10 having a stand-alone structure, a network structure (search expression generation system 100) is adopted.

With reference to FIG. 8, the search expression generation device (search expression generation system 100) according to the second exemplary embodiment of the present invention has a terminal device 200 and a server device 300 connected via a network 400. Since the terminal device 200 is a terminal equivalent to a PC (Personal Computer) containing a browsing program (browser) having a network connection environment, it will be hereinafter referred to as a search expression generation browser 200. Since the server device 100, similarly to the first exemplary embodiment shown in FIG. 1, includes, for example, the arithmetic operation control device 11, the storage device 12, the input/output device 13 and the communication device 14 as hardware to automatically generate an arithmetic operation expression, it will be hereinafter referred to as a search expression generation server 300.

The search expression generation browser 200, in addition to the HTML browsing function not shown, includes an element designation unit 201 and a model sentence collection unit 202.

The element designation unit 201 has a function of designating a search target in each model sentence accumulated in a model sentence accumulation unit 303 of the search expression generation server 300 to obtain a model sentence obtained from the model sentence accumulation unit 303, an identifier which identifies an element to be searched in the model sentence and the element to be searched and forwarding the same to a structured document analysis unit 301 of the search expression generation server 300. The model sentence collection unit 202 has a function of obtaining a structured document to be searched from an external connection server not shown, attaching a document name to the same on a document kind basis and accumulating the obtained document in the model sentence accumulation unit 303 of the search expression generation server 300. Preferable example of a structured document to be searched is an HTML document.

The search expression generation server 300 includes the structured document analysis unit 301, a search expression structuring unit 302, the model sentence accumulation unit 303 and a search expression accumulation unit 304.

The structured document analysis unit 301 has a function of obtaining a structured document from the model sentence accumulation unit 303 by a model sentence forwarded from the element designation unit 201 of the search expression generation browser 200, analyzing the same and determining an element to be added to a search expression or deleted from the same focusing on elements to be searched which are designated by the element designation unit 201. The search expression structuring unit 302 has a function of structuring a search expression based on information received from the structured document analysis unit 301 and accumulating the same in the search expression accumulation unit 304. At this time, the search expression accumulation unit 304 accumulates the search expression structured by the search expression structuring unit 302 together with a document name and an element name. The model sentence accumulation unit 303 and the search expression accumulation unit 304 are assigned to and stored in a predetermined region on the storage device that the search expression generation server 300 has.

According to thus structured search expression generation system 100, the model sentence collection unit 202 of the search expression generation browser 200 first obtains a plurality of model sentences formed of an HTML document from an external connection server not shown and accumulates the same in the model sentence accumulation unit 303 of the search expression generation server 300 via the network 400. At this time, the model sentence accumulation unit 303 accumulates the model sentences on a basis of a kind of HTML document obtained under the control of the model sentence collection unit 202. Subsequently, the element designation unit 201 of the search expression generation browser 200 designates an element to be searched in the plurality of model sentences, so that the structured document analysis unit 301 of the search expression generation server 300 which has received the element via the network 400 analyzes a document structure of the model sentence to select an element to be added to a search expression as a condition and an element to be de deleted from the search expression as a condition. It is assumed that at the time of selection, the structured document analysis unit 301 generates a search expression with a condition added which is common to a plurality of model sentences of the same kind and the search expression structuring unit 302 executes operation of actually adding the element selected by the structured document analysis unit 301 or deleting the same.

More specifically, the above-described search expression generation browser 200 forming search expression generation system 100 and each constituent block of the search expression generation browser 200 according to the second exemplary embodiment of the present invention execute the operation according to the flow charts of FIG. 2 and FIG. 3 similarly to the first exemplary embodiment shown in FIG. 1 with the only difference in that data is transmitted and received via the network 400. No detailed description will be therefore made thereof in order to prevent an overlap.

The search expression generation browser 200 may be structured not to include the model sentence collection unit 202, and the model sentence accumulation unit 303 of the search expression generation server 300 may comprise an HTTP proxy function. In this case, the search expression generation browser 200 will obtain a model sentence via the model sentence accumulation unit 303 of the search expression generation server 300, and the model sentence accumulation unit 303 will transfer the obtained model sentence to the search expression generation browser 200, so that the search expression generation browser 200 will accumulate the same therein.

Effects of the Second Exemplary Embodiment

Since the search expression generation system 100 according to the present exemplary embodiment of the present invention is structured to use a plurality of model sentences to generate a search expression from an element common to them, it is possible to automatically generate a search expression which enables reliable designation of an element to be searched for a Web page whose contents change according a system state or the number of elements to be displayed.

Since the search expression generation system 100 according to the present exemplary embodiment of the present invention is structured to use a plurality of model sentences to generate a search expression including an element of a whole document common to them, it is possible to generate a search expression which enables automatic detection of a change of a structure for a Web page whose contents change according a system state or the number of elements to be displayed. Moreover, since it is structured to generate, from a plurality of model sentences, a search expression including, as a condition, an element unchangeable even when a system state or the number of elements to be displayed changes, it is possible to generate a search expression by which none of elements not to be searched is erroneously detected for a Web page whose contents change according to a system state or the number of elements to be displayed even when a Web page to be searched has a change in the number of elements or has a similar character string.

The functions that the search expression generation browser 200 or the search expression generation server 300 shown in FIG. 8 has may be realized all in software or at least a part of them may be realized in hardware. The data processing, for example, of designating an element to be searched in a plurality of model sentences by the element designation unit 201, analyzing a structure of the model sentence designated by the element designation unit 201 to generate a search expression with a condition common to a plurality of model sentences of the same kind added by the structured document analysis unit 301 and adding or deleting the selected element by the search expression structuring unit 302 may be realized on a computer by one or a plurality of programs or at least a part of the same may be realized in hardware.

Although the present invention has been described with respect to the preferred exemplary embodiments and modes of implementation in the foregoing, the present invention is not necessarily limited to the above-described exemplary embodiments and modes of implementation but can be modified without departing from the scope of its technical idea.

INCORPORATION BY REFERENCE

This application is based upon and claims the benefit of priority from Japanese patent application No. 2009-141908, filed on Jun. 15, 2009, the disclosure of which is incorporated herein in its entirety by reference.

What is claimed is:
1. A search expression generation device comprising:
an input/output device;
an arithmetic operation control device;
a storage device;
a model sentence accumulation unit which accumulates a plurality of model sentences of structured documents to be searched in the storage device on a kind basis by said arithmetic operation control device;
an element designation unit which designates an element to be searched in a plurality of model sentences, wherein the input/output device is configured to allow a user to control the element designation unit to specify the element to be searched;
a structured document analysis unit which analyzes, by said arithmetic operation control device, a structure of said model sentence designated to select an element to be added to a search expression as a condition, and an element to be deleted from the search expression as a condition based on said element designated to be searched; and a search expression structuring unit which adds or deletes said element selected to or from a search expression by said arithmetic operation control device, wherein:

said structured document analysis unit analyzes a structure of a model sentence designated by said element designation unit to generate a search expression with a condition added which is common to a plurality of model sentences of the same kind, the arithmetic operation control device is implemented via a CPU; and said structured document analysis unit sequentially obtains a parent element of said element to be searched and an element position, and with respect to a first model sentence, generates a main search expression formed of elements to be traced back to said element to be searched from a top element and with respect to a model sentence after the first sentence, compares the element with an element of said main search expression generated and eases a condition of said main search expression with respect to a part failing to coincide.

2. The search expression generation device according to claim 1, wherein said structured document analysis unit analyzes a structure of a model sentence designated by said element designation unit to delete an element differing in a plurality of model sentences of the same kind from said search expression.

3. The search expression generation device according to claim 1, wherein said structured document analysis unit, with respect to said first model sentence, further generates a search expression with a child element of an element forming said main search expression recursively added to the condition of said main search expression and with respect to a model sentence after the first sentence, further eases a condition failing to coincide with the second model sentence among conditions added to said search expression generated.

4. The search expression generation device according to claim 3, wherein said structured document analysis unit limits the number of child elements to be added to said condition to the number of elements predetermined with respect to an element to be traced from a constituent element of said main search expression.

5. The search expression generation device according to claim 1, wherein said structured document analysis unit generates, as said main search expression, a pair of an element name of an element to be traced back to said element to be searched from the top element and a numerical value indicative of a position of the element in brother elements.

6. The search expression generation device according to claim 1, wherein said structured document analysis unit selects either one of a name of at least one of elements forming said main search expression and a position of the element in said brother elements as a condition of said main search expression to be eased.

7. The search expression generation device according to claim 1, wherein said structured document analysis unit traces an arbitrary number of arbitrary elements with respect to a part of elements forming said main search expression in order to ease the condition of said main search expression.

8. The search expression generation device according to claim 1, wherein said search expression structuring unit searches for a model sentence used before by a search expression generated by said structured document analysis unit to confirm that only a single element is searched with respect to each model sentence.

9. The search expression generation device according to claim 1, wherein said search expression structuring unit structures an XPath expression from a search expression generated by said structured document analysis unit.

10. The search expression generation device according to claim 1, wherein said search expression structuring unit accumulates a search expression generated by said structured document analysis unit in a search expression accumulation unit assigned to a predetermined region of said storage device.

11. The search expression generation device according to claim 1, further comprising:

a communication device which communicates with a server device externally connected via a network, and a model sentence collection unit which obtains said model sentence from said server device by means of said communication device to accumulate the model sentence in said model sentence accumulation unit.

12. A search expression generation system comprising:

an input/output device;

an arithmetic operation control device;

a storage device;

a search expression generation browser including an element designation unit which designates each element to be searched in a plurality of model sentences and a model sentence collection unit which obtains said model sentence from outside the device and accumulates said model sentence on a document kind basis; and a search expression generation server having a model sentence accumulation unit connected to said search expression generation browser via a network for accumulating said model sentence in the storage device on a document kind basis by said arithmetic operation control device, a structured document analysis unit which analyzes, by said arithmetic operation control device, a structure of said structured document to select an element to be added to a search expression as a condition based on said search target element designated and an element to be deleted from the search expression as a condition, and a search expression structuring unit which adds or deletes said element selected to or from a search expression by said arithmetic operation control device, wherein:

said structured document analysis unit of said search expression generation server analyzes a structure of a model sentence designated by said element designation unit to generate a search expression with a condition added which is common to a plurality of model sentences of the same kind;

the input/output device is configured to allow a user to control the element designation unit to specify the element to be searched;

the search expression generation server is implemented via a CPU; and said structured document analysis unit sequentially obtains a parent element of said element to be searched and an element position, and with respect to a first model sentence, generates a main search expression formed of elements to be traced back to said element to be searched from a top element and with respect to a model sentence after the first sentence, compares the element with an element of said main search expression generated and eases a condition of said main search expression with respect to a part failing to coincide.

13. The search expression generation system according to claim 12, wherein said model sentence collection unit includes a Web browser to obtain an HTML document from a model sentence storage server further connected via said network.

14. The search expression generation system according to claim 12, wherein said model sentence accumulation unit has a proxy function to accumulate an HTML document obtained by said model sentence collection unit.

15. A search expression generation server connected via a network to a search expression generation browser comprising an input/output device, an arithmetic operation control device, a storage device, an element designation unit which designates each element to be searched in a plurality of model sentences and a model sentence collection unit which obtains said model sentence from outside the device and accumulates said model sentence on a document kind basis, comprising:
  a model sentence accumulation unit which accumulates a plurality of model sentences obtained by said model sentence collection unit in the storage device on a document kind basis by said arithmetic operation control device;
  a structured document analysis unit which analyzes, by said arithmetic operation control device, a structure of said structured document to select an element to be added to a search expression as a condition and a condition to be deleted from said search expression based on said designated element to be searched; and
  a search expression structuring unit which adds said element to be added which is selected by said structured document analysis unit to said search expression and deletes said condition to be deleted which is selected by said structured document analysis unit from said search expression by said arithmetic operation control device, wherein:
    said structured document analysis unit analyzes a structure of a model sentence designated by said element designation unit to generate a search expression with a condition added which is common to a plurality of model sentences of the same kind;
    the input/output device is configured to allow a user to control the element designation unit to specify the element to be searched;
    the search expression generation server is implemented via a CPU; and
    said structured document analysis unit sequentially obtains a parent element of said element to be searched and an element position, and with respect to a first model sentence, generates a main search expression formed of elements to be traced back to said element to be searched from a top element and with respect to a model sentence after the first sentence, compares the element with an element of said main search expression generated and eases a condition of said main search expression with respect to a part failing to coincide.

16. A search expression generation method for use in a search expression generation device including an input/output device, an arithmetic operation control device and a storage device, comprising:
  a model sentence accumulation step of accumulating a plurality of model sentences of structured documents to be searched in the storage device on a kind basis by said arithmetic operation control device;
  an element designation step of designating elements to be searched in a plurality of model sentences, wherein a user specifies the elements to be searched via the input/output device;
  a structured document analysis step, by said arithmetic operation control device, of analyzing a structure of said structured document based on a search target element designated at said element designation step to select an element to be added to a search expression as a condition and an element to be deleted from said search expression as a condition; and
  a search expression structuring step of adding or deleting an element selected at said structured document analysis step to or from said search expression by said arithmetic operation control device;
  wherein said structured document analysis step further comprises sequentially obtaining a parent element of said element to be searched and an element position, and with respect to a first model sentence, generating a main search expression formed of elements to be traced back to said element to be searched from a top element and with respect to a model sentence after the first sentence, comparing the element with an element of said main search expression generated and easing a condition of said main search expression with respect to a part failing to coincide.

17. A search expression generation method for use in a search expression generation system having a search expression generation server and a search expression generation browser connected via a network, comprising:
  a model sentence collection step of externally obtaining a plurality of model sentences of structured documents to be searched and accumulating said model sentence obtained in said search expression generation server on a document kind basis by said search expression generation browser;
  an element designation step of designating each element to be searched, wherein a user specifies the elements to be searched via the search expression generation browser;
  a structured document analysis step of analyzing a structure of said structured document based on an element designated at said element designation step to select an element to be added to a search expression as a condition and an element to be deleted from the search expression as a condition by said search expression generation server; and
  a search expression structuring step, by said search expression generation server, of adding or deleting an element selected at said structured document analysis step to or from said search expression;
  wherein said structured document analysis step further comprises sequentially obtaining a parent element of said element to be searched and an element position, and with respect to a first model sentence, generating a main search expression formed of elements to be traced back to said element to be searched from a top element and with respect to a model sentence after the first sentence, comparing the element with an element of said main search expression generated and easing a condition of said main search expression with respect to a part failing to coincide.

18. A non-transitory computer-readable medium storing a search expression generation program which is to be executed on a computer, the computer comprising an input/output device, an arithmetic operation control device, and a storage device, and which is provided in a search expression generation device for generating a search expression of a plurality of model sentences of structured documents to be searched, wherein said search expression generation program causes said computer to execute:
- a model sentence collection processing of obtaining said plurality of model sentences and accumulating the model sentences in the storage device on a document kind basis by said arithmetic operation control device,
- an element designation processing of designating an element to be searched in said plurality of model sentences, wherein the input/output device is configured to allow a user to control the element designation unit to specify the element to be searched,
- a structured document analysis processing of analyzing, by said arithmetic operation control device, a structure of said structured document designated by said element designation processing to select an element to be added to a search expression as a condition and an element to be deleted from said search expression as a condition based on said search target element designated, and
- a search expression structuring processing of adding said element selected to said search expression or deleting the element from said search expression, by said arithmetic operation control device;
- wherein said structured document analysis processing further comprises sequentially obtaining a parent element of said element to be searched and an element position, and with respect to a first model sentence, generating a main search expression formed of elements to be traced back to said element to be searched from a top element and with respect to a model sentence after the first sentence, comparing the element with an element of said main search expression generated and easing a condition of said main search expression with respect to a part failing to coincide.

19. A non-transitory computer-readable medium storing a search expression generation program which is to be executed on a computer, the computer comprising an arithmetic operation control device and a storage device, and which is provided in a search expression generation server which externally obtains a plurality of model sentences of structured documents to be searched and is connected to a search expression generation browser which designates each element to be searched in said plurality of model sentences via a network, wherein said search expression generation program causes said computer to execute:
- a model sentence accumulation processing of accumulating a plurality of structured documents obtained by said search expression generation browser in the storage device on a document kind basis by said arithmetic operation control device,
- a structured document analysis processing of analyzing, by said arithmetic operation control device, a structure of said structured document based on a search target element designated by said search expression generation browser to select an element to be added to a search expression as a condition and a condition to be deleted from said search expression, and
- a search expression structuring processing of adding said element to be added which is selected by said structured document analysis processing to said search expression and deleting said condition to be deleted from said search expression by said arithmetic operation device,
- wherein a user specifies the elements to be searched via the search expression generation browser; and
- wherein said structured document analysis processing further comprises sequentially obtaining a parent element of said element to be searched and an element position, and with respect to a first model sentence, generating a main search expression formed of elements to be traced back to said element to be searched from a top element and with respect to a model sentence after the first sentence, comparing the element with an element of said main search expression generated and easing a condition of said main search expression with respect to a part failing to coincide.

* * * * *